(12) United States Patent
Johnson et al.

(10) Patent No.: US 12,510,479 B2
(45) Date of Patent: *Dec. 30, 2025

(54) SYSTEMS, DEVICES, AND METHODS FOR COMPOUND SCREENING USING PREDICTIVE TAGGING

(71) Applicant: ALLEN INSTITUTE, Seattle, WA (US)

(72) Inventors: Gregory Johnson, Seattle, WA (US); Chawin Ounkomol, Seattle, WA (US); Forrest Collman, Seattle, WA (US); Sharmishtaa Seshamani, Seattle, WA (US); Nathalie Gaudreault, Seattle, WA (US); Calysta Yan, Seattle, WA (US); Jianxu Chen, Seattle, WA (US); Susanne Rafelski, Seattle, WA (US)

(73) Assignee: ALLEN INSTITUTE, Seattle, WA (US)

(*) Notice: Subject to any disclaimer, the term of this patent is extended or adjusted under 35 U.S.C. 154(b) by 398 days.

This patent is subject to a terminal disclaimer.

(21) Appl. No.: 18/005,077

(22) PCT Filed: Jul. 28, 2021

(86) PCT No.: PCT/US2021/043430
§ 371 (c)(1),
(2) Date: Jan. 11, 2023

(87) PCT Pub. No.: WO2022/026532
PCT Pub. Date: Feb. 3, 2022

(65) Prior Publication Data
US 2023/0341329 A1    Oct. 26, 2023

Related U.S. Application Data

(60) Provisional application No. 63/058,885, filed on Jul. 30, 2020.

(51) Int. Cl.
*G06K 9/00* (2022.01)
*A61K 35/12* (2015.01)
(Continued)

(52) U.S. Cl.
CPC ....... *G01N 21/6458* (2013.01); *G06T 7/0012* (2013.01); *G06T 7/60* (2013.01);
(Continued)

(58) Field of Classification Search
CPC ...... G06K 9/00; G16B 20/00; A61K 31/5415; A61K 35/12; G01N 21/64
(Continued)

(56) References Cited

U.S. PATENT DOCUMENTS

2016/0370350 A1* 12/2016 Rajwa ................. G01N 33/502
2019/0025291 A1   1/2019 Eggan et al.
(Continued)

FOREIGN PATENT DOCUMENTS

WO    2021/081253 A1    4/2021
WO    2021/113821 A1    6/2021

OTHER PUBLICATIONS

International Search Report & Written Opinion, International Application No. PCT/US2021/043430, Mailing Date: Nov. 18, 2021, 13 pages.
(Continued)

*Primary Examiner* — Seyed H Azarian
(74) *Attorney, Agent, or Firm* — MEDLER FERRO WOODHOUSE & MILLS PLLC

(57) ABSTRACT

The present invention provides various methods for screening one or more compounds, suitably using non-invasive visual methods and neural networks for generating predicted fluorescence images of cells, to assess an effect of the compound on the cell, as well as to classify a compound or
(Continued)

to determine an activity of a compound. Also provided are systems and methods for carrying out such assessments.

18 Claims, 12 Drawing Sheets

(51) Int. Cl.
    *G01N 21/64* (2006.01)
    *G06T 7/00* (2017.01)
    *G06T 7/60* (2017.01)
    *G01N 33/483* (2006.01)
(52) U.S. Cl.
    CPC . *G01N 33/4833* (2013.01); *G01N 2201/1296* (2013.01); *G01N 2500/10* (2013.01); *G06T 2207/20084* (2013.01); *G06T 2207/30024* (2013.01)
(58) Field of Classification Search
    USPC ....... 382/100, 103, 106, 128–134, 154, 156, 382/162, 168, 181, 199, 219, 224, 254, 382/286–291, 305; 436/172
    See application file for complete search history.

(56) References Cited

U.S. PATENT DOCUMENTS

| | | |
|---|---|---|
| 2019/0365818 A1 | 12/2019 | Gunawardane et al. |
| 2019/0384047 A1 | 12/2019 | Johnson et al. |
| 2020/0121666 A1* | 4/2020 | Wong ................. A61K 31/5415 |
| 2020/0134831 A1 | 4/2020 | Chen et al. |
| 2020/0309767 A1* | 10/2020 | Loo ........................ G16B 20/00 |
| 2021/0190762 A1* | 6/2021 | Boehm ............. G01N 33/5008 |
| 2022/0205981 A1* | 6/2022 | Coulombe ......... G01N 21/6428 |
| 2023/0145084 A1* | 5/2023 | Kannan .............. G01N 21/6458 382/128 |
| 2023/0243839 A1* | 8/2023 | Goto ........................ G06T 5/50 436/172 |

OTHER PUBLICATIONS

Ounkomol et al., "Label-free prediction of three-dimensional fluorescence images from transmitted-light microscopy," Nature Methods 15(11):917-920 (2018).

Lee, Gyuhyun et al., "DeepHCS: Bright-Field to Fluorescence Microscopy Image Conversion Using Deep Learning or Label-Free High-Content Screening," (2018) Medical Image Computing and Computer Assisted Intervention—MICCAI 2018; [Lecture Notes in Computer Science] Spinger International Publishing, Cham. vol. 11071 pp. 335-343. XP047669249.

* cited by examiner

Plot of median and SE, N= number of FOV with DNA label free prediction 0.001>P value significant, Cohen d>0.2 small effect, d>0.5 medium effect and d>0.8 large effect

SYSTEMS, DEVICES, AND METHODS FOR COMPOUND SCREENING USING PREDICTIVE TAGGING This application is a U.S. National Phase Application under 35 U.S.C. § 371 of International Application No. PCT/US2021/043430, filed Jul. 28, 2021, which claims priority to U.S. Provisional Application No. 63/058,885, filed Jul. 30, 2020, the contents of each of which are each incorporated herein by reference in their entireties.

FIELD OF THE INVENTION

The present invention provides various methods for screening one or more compounds, suitably using non-invasive visual methods and neural networks for generating predicted fluorescence images of cells, to assess an effect of the compound on the cell, as well as to classify a compound or to determine an activity of a compound. Also provided are systems and methods for carrying out such assessments.

BACKGROUND

Screening of compounds, including both small molecule drugs as well as biologics, is a time consuming and resource-heavy process. The desire to quickly determine if a potential compound has a desired effect, is in a particular compound class, or has a higher activity than other compounds, drives the need for a rapid and simple method to do such screening. However, quickly determining the effect of compound without significant biochemical analysis (e.g., analysis of DNA, RNA or protein production of a test cell) represents a significant need in the drug screening process.

The present invention fulfills these needs by providing methods, systems and devices for assessing the effect of a compound on a cell, through the use of machine learning image processing, including predictive fluorescence imaging.

SUMMARY OF THE INVENTION

In embodiments, provided herein is a method for assessing an effect of a compound on a cell, the method comprising: obtaining a 3D microscopy image that is a transmitted light image of one or more structures of the cell that has been treated with the compound, wherein no fluorescence labeling is included in the 3D microscopy image; generating, with a neural network, a predicted 3D fluorescence image that includes predicted fluorescence labeling of the one or more structures of the cell; identifying the effect of the compound on the cell based on the predicted 3D fluorescence image; and assessing the effect of the compound against a comparison set of one or more known effects for the cell.

In further embodiments, provided herein is a method for assessing a classification of a compound and/or an activity determination of a compound, the method comprising: obtaining a 3D microscopy image that is a transmitted light image of one or more structures of a cell that has been treated with the compound, wherein no fluorescence labeling is included in the 3D microscopy image; generating, with a neural network, a predicted 3D fluorescence image that includes predicted fluorescence labeling of the one or more structures of the cell; identifying the effect of the compound on the cell based on the predicted 3D fluorescence image; and assessing the effect against a comparison set of one or more known compounds for the cell.

DETAILED DESCRIPTION

Figure 1:
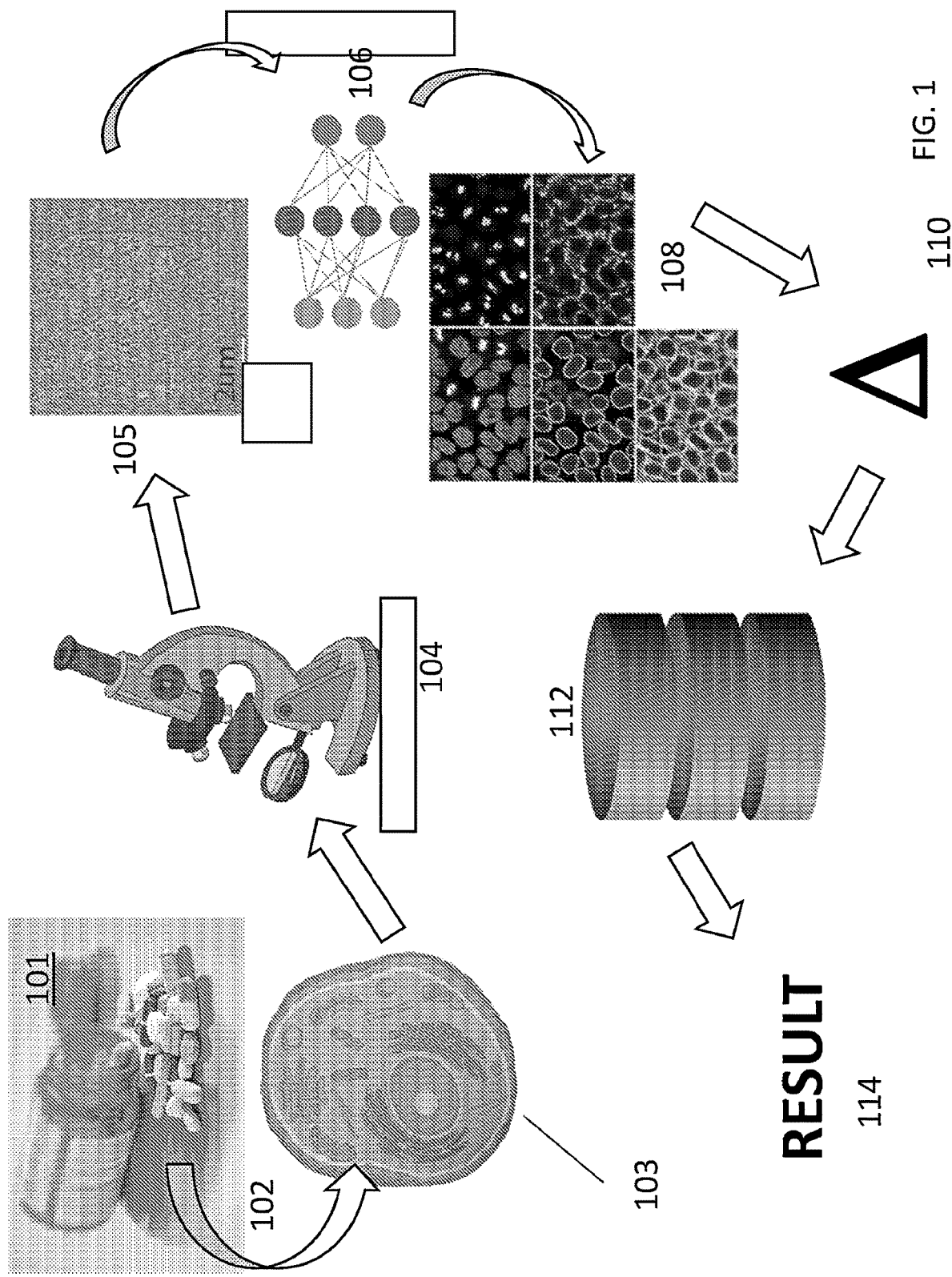
FIG. 1 shows a schematic overview of methods for assessing the effect of a compound on a cell as described herein.

It should be appreciated that the particular implementations shown and described herein are examples and are not intended to otherwise limit the scope of the application in any way.

The published patents, patent applications, websites, company names, and scientific literature referred to herein are hereby incorporated by reference in their entirety to the same extent as if each was specifically and individually indicated to be incorporated by reference. Any conflict between any reference cited herein and the specific teachings of this specification shall be resolved in favor of the latter. Likewise, any conflict between an art-understood definition of a word or phrase and a definition of the word or phrase as specifically taught in this specification shall be resolved in favor of the latter.

The use of the word "a" or "an" when used in conjunction with the term "comprising" in the claims and/or the specification may mean "one," but it is also consistent with the meaning of "one or more," "at least one," and "one or more than one."

Throughout this application, the term "about" is used to indicate that a value includes the inherent variation of error for the method/device being employed to determine the value. Typically, the term is meant to encompass approximately or less than 1%, 2%, 3%, 4%, 5%, 6%, 7%, 8%, 9%, 10%, 11%, 12%, 13%, 14%, 15%, 16%, 17%, 18%, 19% or 20% variability depending on the situation.

The use of the term "or" in the claims is used to mean "and/or" unless explicitly indicated to refer only to alternatives or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited, elements or method steps.

In embodiments, provided herein is a method for assessing an effect of a compound on a cell. As used herein, a "compound" refers to a chemical or biological structure that has been produced by man, by nature (e.g., plant extract), or by modification of a biological process (e.g., a genetically engineered cell, such as a bacterial cell, for producing a desired protein), that is thought to, or designed to, have a particular effect on a cell. Suitably, the compounds that are assessed via the methods described herein are pharmaceutical compounds, including both small molecules and biologics, that are designed, or being tested for, their therapeutic impact on a cell, a disease, or a biological structure (e.g., a virus, a bacteria, a yeast). A "small molecule" refers to a low molecular weight (<900 daltons) organic compound that may regulate a biological process, with a size on the order of 1 nm. A "biologic" refers to any pharmaceutical drug product manufactured in, extracted from, or semisynthesized from, biological sources, such as a genetically manipulated bacterial cell.

As used herein "an effect of a compound on a cell" refers to the measurement and/or determination of one or more characteristics of a cell that are changed because of the interaction between the cell and the compound. Exemplary effects of a compound on a cell include, but are not limited to, one or more of a change in average or median cell size, a change in cell viability, a change in cell confluency, a change in nuclear size, a change in microtubule structure, a change in cell count, a change in cell morphology, a change in cell cycle phase, a change in cell growth rate, a change in cell integrity, a change in membrane integrity, a change in organelle integrity, a change in mitochondrial activation level, a change in differentiation state, etc. The presence or absence of a cell surface protein, can also be an effect of a compound on a cell as described throughout.

As illustrated schematically in FIG. 1, the methods for assessing an effect of a compound 101 on a cell 103 suitably include obtaining a 3D microscopy image 104 that is a transmitted light image 105 of one or more structures of the cell 103 that has been treated 102 with the compound 101. As used herein "treated" suitably includes introducing the compound 101 into the cell 103, for example by simply incubating the cell 103 in a solution of the compound 101, or by introducing the compound 101 into a cell media in which the cell 103 is being held or growing. Compound 101 can also be directly injected or direct added to the cell 103. The length of "treatment" of a cell with a compound can vary from minutes, to hours, to days, to weeks. In embodiments in which the treatment lasts days or weeks, the cells are suitably maintained under conditions to allow for cell proliferation and expansion, and can include changing the cell media to provide appropriate growth factors and nutrients, etc.

It should be understood that the images and schematics shown in FIG. 1 are for representative purposes only and to facilitate a discussion of the methods and systems described herein, and should not be considered limiting structures.

In suitable embodiments, the 3D microscopy image 104 does not contain or include any fluorescence labeling of a cell or a structure of a cell (e.g., cell membrane or organelle), and thus is suitably a bright-field image of the structures of the cell and/or the cell itself. As described herein, the ability to obtain a bright-field image (or other type of image) of a cell or cell structure, and obtain from that image information about the effect of a compound on the cell, without the need for fluorescence labeling, allows for the use of the methods described herein in a significant number of potential applications without the risk of contaminating or changing a cell, thus allowing for a more controlled determination of the effect of the compound on the cell.

Additional imaging modalities can also be used to produce or obtain the initial 3D microscopy image 105. For example, darkfield microscopy can be used, as well as differential interference contrast (DIC) microscopy, electron microscopy, confocal laser scanning microscopy, as well as predicted confocal laser scanning microscopy.

Exemplary structures of a cell that can be imaged via 3D microscopy include, but are not limited to, the entire cell, a cell membrane, a plasma membrane, a nucleus (including DNA or a DNA pattern within the nucleus), a nuclear fragment, a mitochondrion, a microtubule, an actin filament, an intermediate filament, or other cytoskeletal element, an endoplasmic reticulum, a vacuole, an endosome, an autophagosome, a Golgi Apparatus, a membrane protein, a plasma membrane bleb, or a lysosome. Additional cellular structures known in the art can also be imaged via 3D microscopy. While the methods described herein can be carried out utilizing an image of a single structure (e.g., only images of cell membranes), suitably multiple different structures are imaged to form a set of images that ultimately form a descriptive image set or descriptive image portfolio for a cell (including a specific cell type).

In embodiments, the transmitted light image of a structure of a cell is obtained following treatment of the cell with the compound, but in additional embodiments, the transmitted light image can be obtained both before and after the treatment, so as to provide a baseline or control image of the cell. As described herein, the methods for assessing the effect of a compound can be carried out by imaging a single cell, or suitably can be carried out by imaging multiple cells, each of which have been treated with the compound. By taking images of multiple cells, the possibility that a cell has not come fully in contact with the compound, or has not ingested and thus been effected by the compound, is reduced, providing for an average impact or effect on the cells to be determined.

As described herein, suitably the methods of assessing the effect of a compound are carried out in real-time. Thus, the transmitted light image (or other type of image described herein) of the structures of the cell is obtained in real-time, suitably within minutes or hours, after the treatment of the cell with the compound, and without the need for a delay due to removal of a sample or transferring a sample to a separate imaging apparatus (e.g., via tubing apparatus, etc.). In other embodiments, the transmitted light image is obtained days, weeks or even months after treatment of the cell, depending on the timeline of activity of the compound (i.e., how quickly it acts), and depending on if a cell needs to go through expansion to see the complete impact of the treatment.

The methods described herein suitably obtain the transmitted light image (or via other image modality) of the structures of the cell without removal from the cell culture chamber or other suitable holding chamber. Thus, the images are suitably obtained in such a manner that the cells are not disturbed, contacted or manipulated, reducing the possibility of introducing contamination or operational artifacts into the assay. The ability to carry out the methods described herein without removing the cell(s) from the assay also allows for the cells to maintain a constant (or near constant) volume and appropriate number of cells, and limit the destructive impact that a change in volume or number of cells would have on the overall process.

From the 3D microscopy image, a predicted 3D fluorescence image 108 that includes predicted fluorescence labeling of the one or more structures of the cell is generated, with a neural network 106. Methods for generating a predicted a 3D fluorescence image based on the 3D microscopy image (e.g., a brightfield image) are disclosed in detail in U.S. Published Patent Application No. 2019/0384047, "Systems, Devices, and Methods for Image Processing to Generate an Imaging Having Predictive Tagging," the disclosure of which is incorporated by reference herein its entirety, including the methods for generating a predicted 3D fluorescence image.

Following and based on the generated predicted 3D fluorescence image, the effect of the compound 110 on the cell is identified (can also be considered the change in the cell as a result of the treatment with the compound). As described herein, identification of the effect of the compound on the cell can be related to the structure of the cell, including its internal organelles and components, as well as cellular shape, morphology, cell density/confluency, etc. In embodiments, the effect of the compound on the cell is one or more of a change in average or median cell size, a change in cell viability, a change in cell confluency, a change in cell count, a change in cell morphology, a change in cell cycle phase, a change in cell growth rate, a change in cell integrity, a change in membrane integrity, a change in organelle integrity, a change in mitochondrial activation level, a change in the presence or absence of a mycoplasmal, bacterial, fungal or viral contaminant (e.g., a bacterial, fungal or viral infection of the cell), a change in differentiation state, or a change in quantity of transgenic protein produced. Cell viability refers to the ability of a cell to expand and divide according to its normal, natural processes. Cell confluency refers to the spacing or touching between cells on an adherent growth surface (e.g., flask or culture plate surface, etc.) or in a 3D growth matrix (e.g., microporous beads). Cell morphology refers to the shape of a cell. Cell count refers to the number of cells per volume or per area. The presence of absence of a mycoplasmal, bacterial, fungal or viral contaminant may be determined by the impact that such an infective agent has on a cell structure such the nucleus, cell membrane, a cell organelle, etc. In further embodiments, the presence or absence, or probably of the presence or absence, of a protein biomarker on the surface of a cell can be identified as a quality attribute.

Once the effect of the compound on a cell is identified, the effect of the compound is assessed against a comparison set 112 of one or more known effects for the cell, thereby providing a result 114 of the assessment. As used herein, a "comparison set" refers to a collection of data (e.g., a database) that has been specifically prepared for use in assessing the effect of the compound(s) on the cell. Suitably, the comparison set includes information about each of the effects of a plurality of known compounds on one or more cell types. For example, a comparison set can be generated that includes information about a plurality of effects from a plurality of compounds for a cell type, such as mammalian cells, including a human cell, a human tumor cell line, and in particular, cells such as Chimeric Antigen Receptor (CAR) T-cells, Chinese Hamster Ovary (CHO) cells, HeLa cells, Jurkat T-cells, Human Embryonic Kidney (HEK) cells, or stem cells, including human induced pluripotent stem cells (hiPSCs).

Suitably, comparison sets are prepared for each individual cell type and can be provided and distributed to an end user either as individual databases for each cell type, or can be provided as a combination of various cell types depending on the end users application. The comparison sets also suitably include the effects of a variety or different types of compounds. In other embodiments, the comparison sets can include the effects of one type or class of compound on a particular cell type. For example, the comparison set can include the effects of numerous anticancer compounds on a cell type (i.e., a model cell for a particular disease), such as a breast cancer cell model, a leukemia cell model, a neurologic cell model, a pancreatic cancer cell model, a muscle cell model, a brain cell model, a bone cell model, a blood cell model, etc.

The comparison sets can be updated regularly either via an update provided to a computer system, or automatically via wireless downloads and periodic updates. In embodiments, a comparison set is prepared and then not modified during an assessment process. In other embodiments, a comparison set can be automatically or manually updated with new data to further refine or expand the comparison set for a particular cell, class of cells, or multiple cell types, allowing for continued use of the methods and devices described herein with changing cell characteristics or desired cellular outcomes.

The result 114 of the analysis can take various forms and is a variable that can be modified from one cell type to another, and also from compound to compound. For example, the result of assessing the effect against the comparison set can provide a classification of the compound and/or an activity determination of the compound.

Thus, in embodiments, the result of the assessing can provide data that demonstrates that a tested compound is similar to, and has a biological effect that is the same or similar to, a class of compounds that are known to have a particular biological effect. For example, the test compound can be determined to be similar to anticancer compounds, or other types of agents. Thus, the result can help to classify a test compound as a potential use for treatment of one or more diseases or disorders, and thus be considered a similar compound to other known compounds. In other embodiments, the result of the assessing can provide information on the activity of the compound. For example, a determination can be made that the tested compound is very effective at inhibiting one or more cellular processes, or a determination can be made that the tested compound is more effective than a first comparison compound, but less effective than a second comparison compound, at causing a desired effect.

The result of the assessing can also indicate that the tested compound has little effect at all on a desired cellular process, and thus not a candidate for testing. The result of the assessing can also indicate that the tested compound is too toxic (or too toxic at the amount tested), and thus not a candidate for further testing, or requires modification of the amount for use in treatment.

For example, the result 114 may be based on the effect on cell viability and may be a binary determination, i.e., the cell is alive (1) or dead (0), whereas a result 114 based on the effect on organelle integrity may be a graded scale, where a highly potent compound may indicate complete destruction of organelle integrity, but a less potent compound may only destroy a certain percentage of organelle integrity (or a certain percentage of cells showing loss of organelle integrity). In addition, other effects may also have graded scales, such as mitochondrial activation level, differentiation state, quality of transgenic protein produced, etc.

The result 114 of the effect of the compound is suitably quantitative, in that the activity determination of the compound may be measured relative to one or more known compounds, providing a measure of the activity level (i.e., the amount of a compound required to achieve a desired result (0.1 mg/mL, 0.5 mg/mL, 1 mg/mL, 10 mg/mL, 50 mg/mL, etc.)), or a comparison of the activity level relative to another compound (i.e., 50% as effective as compound Y; 0.1 times as effective as compound A, but 10 times more effective as compound C).

The predictive fluorescence labeling described herein and applied to 3D images, is especially useful for structures smaller than the cellular level. Such structures, such as cell membranes, nucleus, and organelles, may be referred to as sub-cellular or intracellular structures. The 3D images may, for instance, be more suitable for training and yield a model that reflects a more accurate relationship between two imaging modalities. However, applying the predictive labeling to 3D images may be especially challenging because the 3D images may consume much more memory space relative to 2D images.

In some instances, inexpensive, commodity computing hardware such as desktops, laptops, or a graphics processing unit (GPU) cluster may have a limited amount of main memory (e.g., dynamic RAM (DRAM)) that cannot accommodate all of the 3D images at the same time, and thus may be constrained in its ability to train a statistical model with the 3D images. In such embodiments, the technical solution may involve storing the 3D images in secondary memory, such as a hard disk drive (HDD), and loading only a portion of the 3D images into the main memory at a time. The technical solution may further divide the training of the statistical model over several iterations. During each iteration, the computing platform may load a new portion of the 3D images from the secondary memory into main memory, and update the statistical model with the new portion of the 3D images. In some cases, the technical solution may involve downsampling the 3D images before they are used in training the statistical model. Thus, the solutions described herein overcome the particular and significant technical challenges involved in implementing predictive labeling for 3D images. While a convolutional neural network is suitably utilized in the methods described herein, other types of statistical models, including deterministic or stochastic models, may be used.

As described herein, the methods of assessing the effect of a compound on a cell combine the benefits of detecting or visualizing specific cellular structures (which can include: intracellular structures, molecules, and foreign bodies, and super-cellular structures, for example groups of cells, networks of cells, regions of living tissue) with the ease and non-invasive nature of, e.g., bright-field imaging or other transmitted light imaging, and the ability to identify and assess the effects of a variety of compounds one or more different cell types or classes. As described in U.S. Published Patent Application No. 2019/0384047, the predictive localization of cellular structures can be visualized by training statistical models using fluorescence images of one or more labeled structures of interest, (e.g., as a first set of 3D images of a plurality of sets of 3D images), to predict the labeling of those structures in three dimensional microscopy images without any structural labeling (e.g., as a second set of 3D images).

Figure 2:
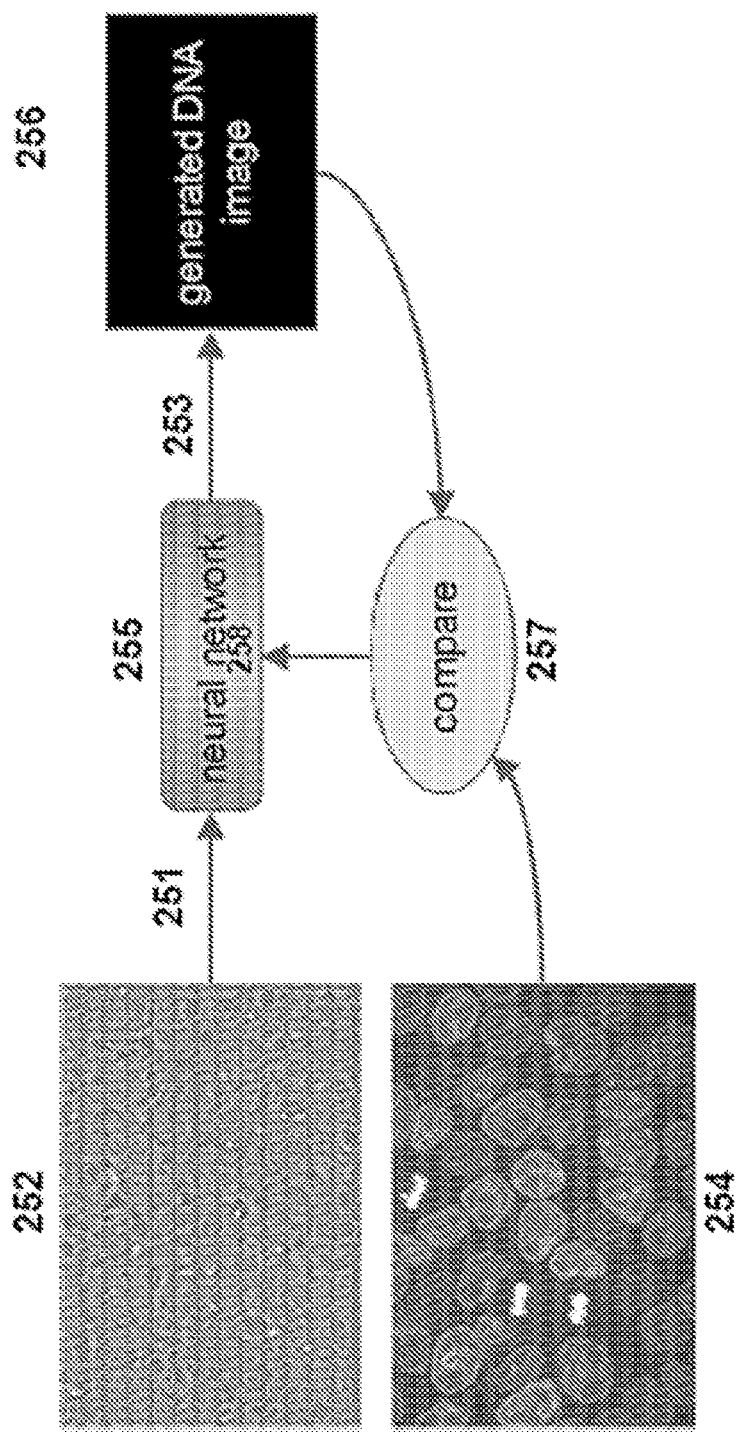
FIG. 2 shows a system for generating and iteratively training a statistical model, for use in embodiments hereof.

FIG. 2 illustrates an example of a system for generating and iteratively training a statistical model, which can also be referred to more generally as a model, for visualizing the localization of cellular structures by predicting or otherwise identifying the location of tags, dyes, and other labels for those cellular structures, as described in U.S. Published Patent Application No. 2019/0384047. As described herein, such processes are utilized in the methods for assessing an effect of a compound as described herein during the generation of a predicted 3D image. In the example of FIG. 2, the cellular structures can be DNA structures within a cell, but this can be extended to other structures described herein. More particularly, FIG. 2 illustrates some of the steps involved in each iteration of training the statistical model, to optimize the parameters of the statistical model for the predictive localization of the DNA structure within cells. For instance, a processor can be configured to retrieve a transmitted light image 252 of a cell culture, including cells which have been treated with a test compound. The transmitted light image 252 can be considered an unlabeled image. The processor can be configured to generate a statistical model, such as a neural network 258, using the unlabeled image 252 and a labeled image 254 of cells. Image 254 and image 252 are of the same section of cells. Image 254 can be a fluorescent image (also referred to as a fluorescence image) of that same section of the cells, wherein the DNA structure is labelled with a fluorescent Hoechst dye that binds to DNA material as an example, although other labels (e.g. dyes, and/or tags) could be used. In an embodiment, the image 252 and the image 254 may be brought into alignment with each other before being used to train the neural network 258.

At step 251, the processor can generate and train the neural network 258 or other statistical model to learn the association between the unlabeled image 252 and the labeled image 254. At step 255, the processor can use the trained neural network 258 to apply the trained statistical model on the unlabeled image 252 to generate, at step 253, a predicted labeling indicated by generated image 256. For instance, the predicted labeling can predict or otherwise estimate which portions of the unlabeled image 252 of a cell sample would have a particular dye color if the image 252 had instead been obtained by performing fluorescence imaging on the same sample. This prediction can be used to generate a predicted (e.g., approximate or estimated) fluorescence image of the cells from an unlabeled image, and can then be utilized in the methods of assessing an effect of a compound as described herein.

Suitably, the systems, devices, and methods disclosed herein utilize deep learning (deep structural learning, hierarchical learning, machine learning, and architecture) to predict the localization of cells or specific cellular structures from three dimensional bright-field microscopy images or other transmitted light images collected during the methods of assessment. The disclosed systems, devices, and methods serve to transfer information (e.g., object or structure specific labeling) contained in a three dimensional stack of imaging data, in one imaging modality, to another imaging modality, thereby allowing use of the advantageous properties of both imaging modalities. The disclosed systems and methods can be characterized by quantifying the relationship between image stacks in each imaging modality. For example, an implementation of predictive localization of sub-cellular structures can be characterized by quantifying image information about specific structures predicted from transmitted light images and from the localization of dye and nuclei labelled with Green Fluorescent Protein (GFP). This predictive localization is then used to identify an effect of the compound as described herein.

The effect of the compound is then assessed against a comparison set as described herein. Data to compose the comparison set can be stored on a hard disk drive (HDD), a solid state drive (SDD), a tape drive, DRAM, any other form of memory, or any combination thereof. In some cases, the comparison set is, or can be, or can implement, a database. The data for the comparison set can also be stored remotely, and the methods described herein access the data via a wireless or wired internet connection, etc.

As described herein, the methods of assessing the effect of a compound suitably utilize a neural network to generate predictive fluorescence labeling. The predictive methods may be performed by a processor of a computing device executing computer-executable instructions stored in a non-transitory computer-readable medium, such as the processor executing instructions stored in the non-transitory computer readable medium. The predictive methods may focus on three-dimensional (3D) images of cellular structures. The cellular structures may include cell components and other structures smaller than the cell level, such as cell membranes, nucleus, a nuclear fragment, and cell organelles (e.g., mitochondrion, endoplasmic reticulum, vacuole, Golgi Apparatus, an autophagosome, a plasma membrane bleb, or a lysosome). In some instances, the use of 3D images may be advantageous, because they may contain image data along an additional dimension (relative to 2D images), and thus may provide more image data for training the neural network described herein. However, the use of 3D images may involve additional processing that deals with the significantly larger memory size of such 3D images.

In an embodiment, the predictive methods include a step, in which the processor receives a first set of three-dimensional (3D) microscopy images and a second set of 3D microscopy images. In an embodiment, the first set of 3D microscopy images and the second set of 3D microscopy images are received via a communication interface, such as an I/O unit, from an image storage device or directly from an image sensor of a microscope.

In an embodiment, the first set of 3D microscopy images may be 3D fluorescence images of a plurality of cellular structures in a plurality of cell samples, and the second set of 3D microscopy images are 3D transmitted light images of cellular structures, wherein no fluorescence labeling is included in the second set of 3D microscopy images, and the light images are from a cell treated with a test compound, suitably taken in real time.

In an embodiment, the first set of 3D microscopy images may include a single fluorescence channel, wherein each channel may correspond to a particular fluorescence marker or its emission spectrum. For instance, such a set of 3D microscopy images may include color (or, more generally, contrast information) from only green fluorescence protein (GFP), or from only a frequency filter band corresponding to the emission spectrum of GFP. Such 3D microscopy images may thus display or otherwise include only those sub-cellular structures in a particular tissue sample that are tagged by GFP. In an embodiment, the first set of 3D microscopy images may include multiple fluorescence channels.

In an embodiment, the second set of 3D microscopy images may have been captured with transmitted light using, e.g., Kohler illumination. In an embodiment, each of the second set of 3D microscopy images is at least one of a brightfield image, a darkfield image, or a differential interference contrast (DIC) image. In an embodiment, cellular structures to which the predictive imaging methods are applied may include structures (e.g., mitochondrion) having a lipid envelope, which may exhibit a different refractive index than its surrounding. The second set of 3D microscopy images do not include any fluorescence labeling.

Figure 3:
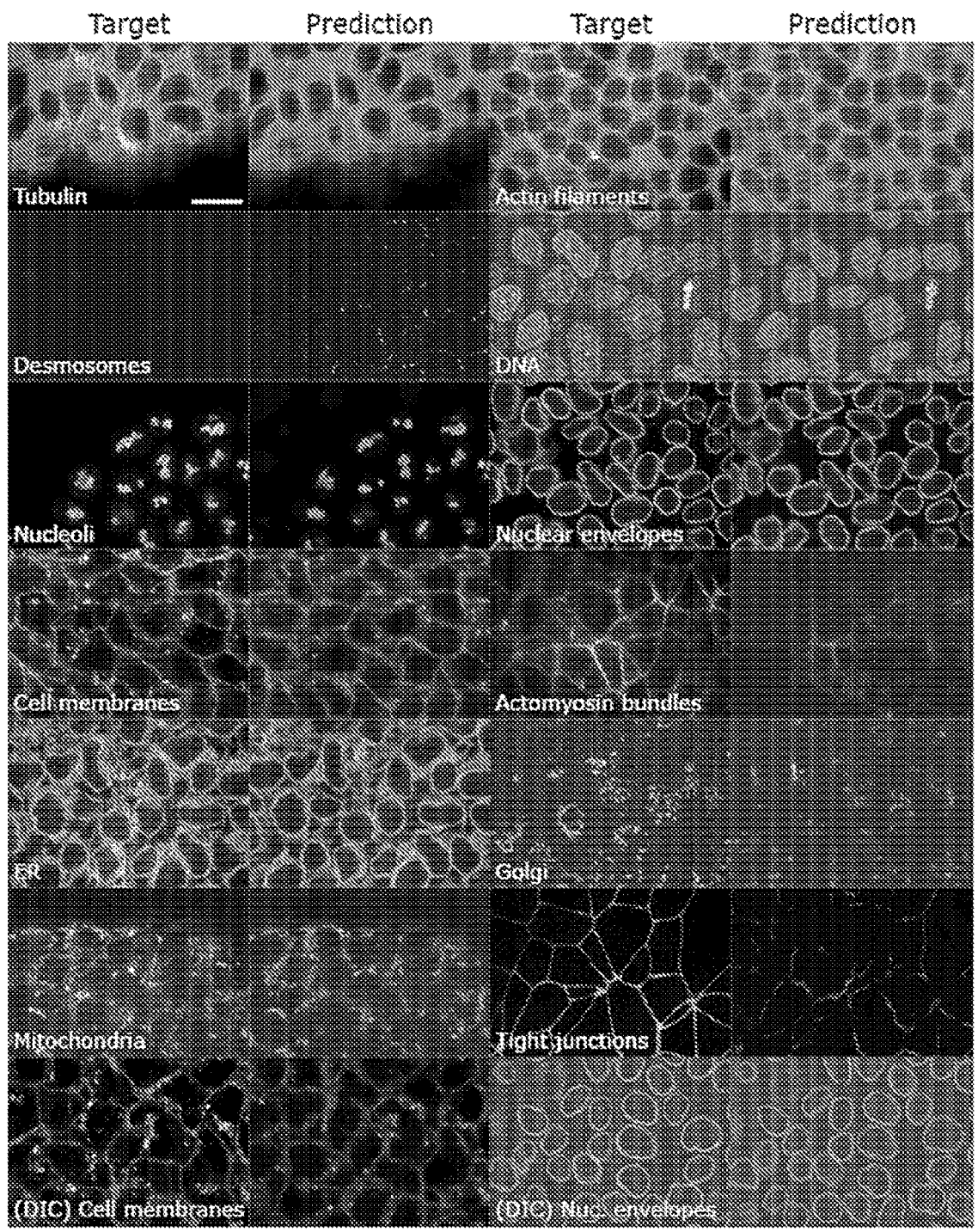
FIG. 3 shows exemplary predictive 3D fluorescence imaging in accordance with embodiments hereof.

FIG. 3 shows a comparison of true fluorescence labeled images to predicted fluorescence images. More specifically, the figure shows additional labeled structure models and predictions for 3D light microscopy. For each model, a single z-slice of a ground-truth (observed) fluorescence image is shown beside an image predicted by a labeled structure model, given the corresponding 3D transmitted light image as input (latter not shown). All models use bright-field images as inputs except for models shown in the last row, which were trained on DIC images. Z-slices were chosen in a curated fashion to highlight the structure of interest associated with each model. Image-slice pairs were identically contrast stretched, such that black and white values corresponded to the 0.1 and 99.9th percentiles of the target image intensity, respectively. All images shown are independent from model training data. The scale bar is 20 micron.

As described herein, the methods for assessing an effect of a compound on a cell can be utilized to assess the effect of small molecule compounds as well as biologics. Exemplary compounds include, but are not limited to, anticancer compounds, antiviral compounds, compounds to treat neurological disease, compounds to treat a blood disease, compounds to treat a muscular disease, compounds to treat a bone disease, etc.

In exemplary embodiments, the compounds that can be assessed utilizing the methods described herein are anticancer compounds. Exemplary classes of anticancer compounds include, but are not limited to microtubule inhibitors, alkylating agents, antimetabolites, mTOR inhibitors, topoisomerase I or II inhibitor, etc.

For example, if the compound being assessed (a test compound) is thought to be, or is being examined for its potential use as, a microtubule inhibitor (such as a taxane), or an mTOR inhibitor (such as rapamycin) the methods described herein can be utilized to obtain a 3D microscopy image (suitably a transmitted light image) of a cancer cell model, such as a breast cancer cell line such as MCF-7, or a differentiated stem cell, or other cell types. The methods utilize the neural network approach described herein to generate a predicted 3D fluorescence image that includes predicted fluorescence labeling of microtubules of the cell. From this generated, predicted 3D fluorescence image, the effect of the compound, i.e., the inhibition of microtubule formation, a reduction of microtubule formation, a change in microtubule structure, a change in nuclear size, an increase in DNA density, if any, can be identified. The effect of the compound, i.e. the reduction of microtubule formation or change in microtubule structure, if any, is then assessed against a comparison set. This comparison set, can include for example, the amount of microtubule inhibition that has been determined for other, known microtubule inhibiting compounds in the same cell line. The comparison set can also include data from varying concentrations of other microtubule inhibiting compounds. Then, based on the effect of the tested compound, the methods described herein can provide information on, for example, a classification of the compound (e.g., this test compound is also a microtubule inhibitor) and/or an activity determination of the compound (e.g., this test compound is less effective or more effective than a known microtubule inhibitor). As used herein a "classification of a compound" provides information on the type of compound (e.g., antitumor compound, or microtubule inhibitor), as well as the potential use of the compound. As used herein an "activity determination" of a compound can include the amount of a compound needed to provide a desired therapeutic effect; how much of a compound (i.e., 50 mM) is needed to have an effect similar to a known compound; and/or the relative amount of a compound required to have the same effect as a known compound (i.e., 0.1 times less relative to known compound A), etc.

In further embodiments, provided herein is a method for assessing a classification of a compound and/or an activity determination of a compound. In such embodiments, a 3D microscopy image that is a transmitted light image of one or more structures of a cell that has been treated with the compound is obtained, wherein no fluorescence labeling is included in the 3D microscopy image. Then, a predicted 3D fluorescence image that includes predicted fluorescence labeling of the one or more structures of the cell is generated with a neural network. The effect of the compound on the cell based on the predicted 3D fluorescence image is then identified, and the effect is assessed against a comparison set of one or more known compounds for the cell.

As described herein, the one or more structures that can be identified include at least one of a cell membrane, a plasma membrane, a nucleus, a nuclear fragment, a mitochondrion, a microtubule, an endoplasmic reticulum, a vacuole, an endosome, an autophagosome, a Golgi Apparatus, a membrane protein, a plasma membrane bleb, or a lysosome.

Suitably, the effect of the compound that is assessed is suitably one or more of a change in average or median cell size, a change in cell viability, a change in cell confluency, a change in cell count, a change in cell morphology, a change in cell cycle phase, a change in cell growth rate, a change in microtubule structure, a change in nuclear size, a change in cell integrity, a change in membrane integrity, a change in organelle integrity, a change in mitochondrial activation level, a change in differentiation state, or a change in quantity of transgenic protein produced. Other effects of test compounds can also be assessed as described herein, depending on the type of compound being assessed and the potential effect(s) that it may have on a cell.

As described herein, the cell that is utilized in the compound assessment is suitably a mammalian cell, including for example various model cell lines and human cells, and in embodiments is a cancer cell, a Chimeric Antigen Receptor (CAR) T-cell, a Chinese Hamster Ovary (CHO) cell, a Human Embryonic Kidney (HEK) cell, an HeLa cell, a Jurkat T-cell, or a stem cell, including stem cells that have been differentiated into various cell types.

Exemplary compounds that can be assessed, including compounds that can be assessed with regard to their classification and/or activity determination, include biologics and small molecules. Suitable compounds that can be assessed include anticancer compounds, antiviral compounds, compounds to treat neurological disease, compounds to treat a blood disease, compounds to treat a muscular disease, compounds to treat a bone disease, etc. Exemplary anticancer compounds that can be assessed include, for example, a microtubule inhibitors (such as taxanes), alkylating agents, antimetabolites, mTOR inhibitors, or topoisomerase I or II inhibitors.

Figure 4:
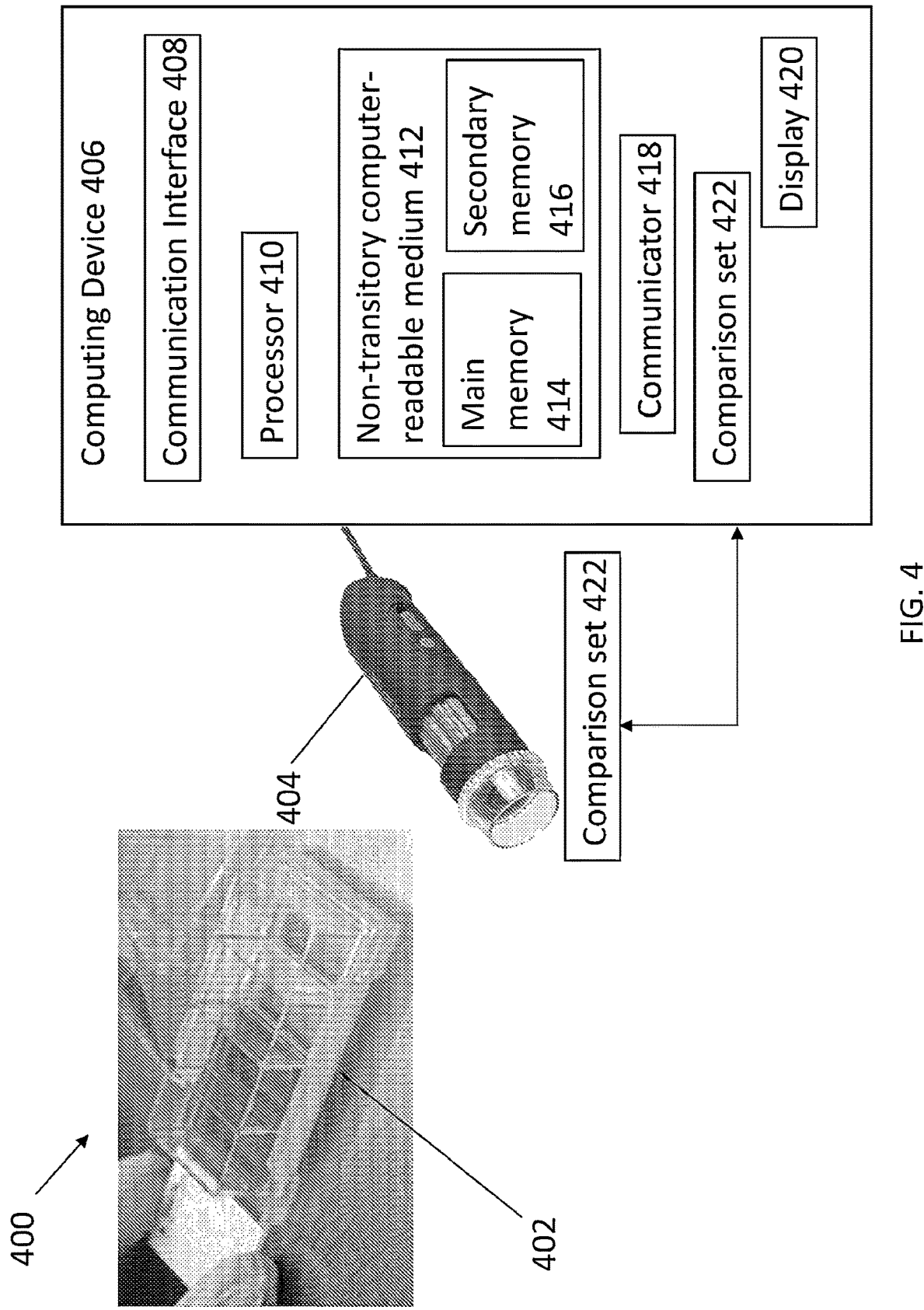
FIG. 4 shows a system for assessing the effect of a compound on a cell, in accordance with embodiments hereof.

In further embodiments, provided herein are systems 400 for assessing an effect of a compound on a cell. A schematic illustrating the components of system 400 is provided in FIG. 4. The scale and arrangement of the components of system 400 are provided for illustrative purposes only, and should not be construed as limiting.

In embodiments, system 400 includes a cell culture chamber 402 or similar device for holding a cell or a cell culture during the assay. Exemplary cell culture chambers 402, including sizes and characteristics, are known in the art, and can include multiple wells for holding individual cells (e.g. a 96 well-plate, etc.), or simply individual chambers for holding different cell cultures or combinations of cells. The cell culture chambers 402 can also include a way or mechanism to introduce a compound that is to be tested and assessed into the cell culture chamber. This can include an injection port, a syringe port, or a mechanism for washing the cells prior to changing the cell media which can then include the compound being tested. While a cell culture chamber 402 also suitably allows for the cells to be maintained and expand or proliferate, this is not a requirement of the cell culture chamber, particularly if the assessment of the compound can take place within a matter of minutes or hours, rather than days or weeks. System 400 further includes a microscope 404 configured to obtain a 3D microscopy, transmitted light image of a structure of a cell in the cell culture chamber 402 (or other 3D microscopy image source, such as darkfield microscopy, DIC microscopy, electron microscopy, confocal laser scanning microscopy (CLSM) or predicted CLSM). Microscope 404 can include a camera interface, including a fiber optic or other suitable interface, for connecting to cell culture chamber 402, or microscope 404 can simply be directly connected to cell culture chamber 402 (or within a suitable distance from the cell culture chamber) to be able to obtain a 3D microscopy, transmitted light image of a structure of a cell. Suitably, microscope 404 is directly coupled or connected to cell culture chamber 402 such that it is integrated into the cell culture chamber.

System 400 suitably further includes a computing device 406 that includes a communication interface 408 configured to receive the 3D microscopy, transmitted light image. Communication interface 408 can be directly connected to microscope 404 via a wired connection, or can be wirelessly connected, for example via Bluetooth connection, or can be networked together via internet connection, etc.

Computing device 406 further includes a processor 410, and a non-transitory computer-readable medium 412 communicatively coupled to the communication interface and to the processor, and storing computer-executable instructions that, when executed by the processor, causes the processor to: generate, with a neural network, a predicted 3D fluorescence image that includes predicted fluorescence labeling of the one or more structures of the cell, including sub-cellular structures. Non-transitory computer-readable medium 412 suitably further includes, stored computer-executable instructions that, when executed by the processor, identify an effect of the compound on the cell based on the predicted 3D fluorescence image, and assess the effect of the compound against a comparison set 422 for the cell. Comparison set 422 is suitably included in computing device 406, but can also be housed on an external computing device, for example a remote database that can be access via internet connection or wireless (e.g., Bluetooth) connection. Computing device 406 also suitably further includes a communicator 418 for example, for communicating with external comparison set 422, or for communicating with an additional computing device that is monitoring the systems and methods described herein. Computing device 406 also suitably further includes a display 420, for example a screen output, that can be used to show the results of the predictive imaging, the identification of the effect of the compound, and/or the assessment of the effect of the compound as a visual or quantitative output. Exemplary visual and/or quantitative outputs of the effect of a compound can include, for example, numeric or graphical displays of cell viability, cell integrity, cell confluency measurements, designations of cell cycle, number of cells, percentage of live cells, percentage of likelihood of microbial contamination, density or number of surface protein biomarkers, etc.

Systems 400 described herein for assessing the effect of a compound can also be automated, in that once they are initiated, the effect of the compound on the cell can be monitored continuously, randomly, or at a set periodic time, or set to coincide with a particular stage of the cell cycle to provide real-time information regarding the effect of the compound.

As described herein, microscope 404 is suitably configured to obtain the 3D microscopy, transmitted light image without removal of the cell from the cell culture chamber, thus allowing for real-time imaging, without disturbing the cell or cells of a culture and thereby limiting contamination and disruption of the process.

EXAMPLES

Example 1: Assessing the Effect of an mTOR Inhibitor

The following example outlines experiments that were undertaken to determine the effect that an mTOR inhibitor, such as rapamycin, has on cells and how these effects can be assessed using the various methods described herein.

Figure 5:
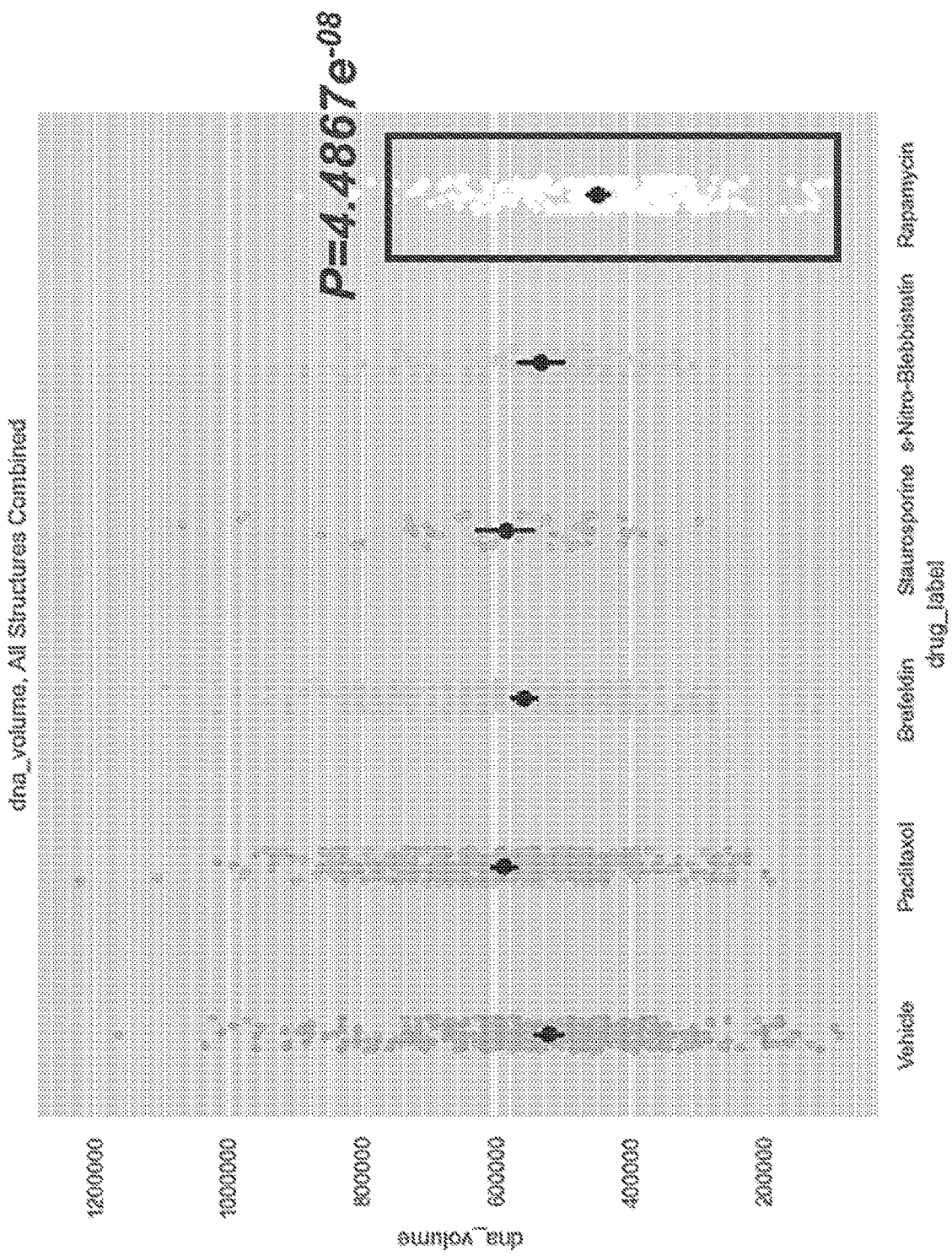
FIG. 5 shows the effect of five drugs on DNA volume in hiPSCs.

Rapamycin, an inhibitor of the mTOR pathway and activator of autophagy is known to induce G1/S cell cycle arrest within 24 hr. Rapamycin significantly reduces DNA volume, as illustrated in FIG. 5, showing the effect of five drugs on DNA volume in a human induced pluripotent stem cell (hiPSC). As illustrated, Rapamycin caused the largest reduction in DNA volume, relative to control (vehicle), of the five drugs tested.

On order to correlate this effect with a characteristic that can be visually observed, control hiPSCs were labeled with NucBlue Live (DNA) and this fluorescent signal was used to train and validate the label free prediction model of the effect of Rapamycin on nuclear size.

Figures 6A, 6B, 6C, 6D, 6E, 6F:
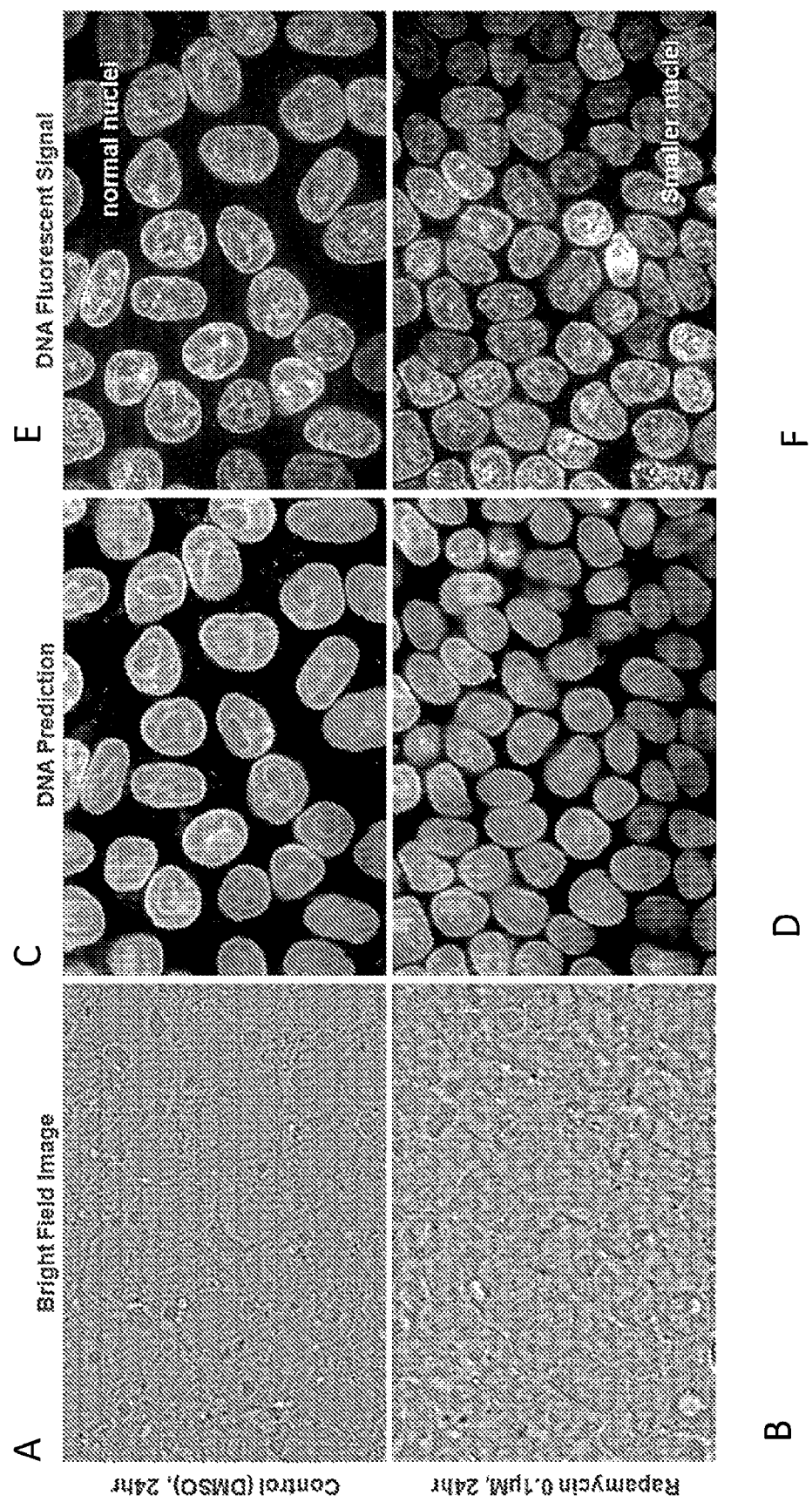
FIGS. 6A-6F show the assessment of the effect of Rapamycin on hiPSCs using the label-free methods described herein.

FIG. 6A shows a brightfield image of hiPSCs treated with DMSO after 24 hours (control). FIG. 6B shows a brightfield image of hiPSCs treated with 0.1 µM Rapamycin after 24 hours.

FIG. 6E shows a fluorescence image of the control cells, labeled with NucBlue Live, to stain for DNA. FIG. 6F shows a fluorescence image of the Rapamycin treated cells, also labeled with NucBlue Live, illustrating the reduction in DNA volume, and thus reduced nuclear size (nuclear volume)—i.e., smaller size.

FIGS. 6C and 6D show the predicted images, based on the label free prediction model, obtained by imaging the nucleus of the cells with brightfield microscopy, and predicting nuclear size/nuclear volume, based on the trained model. As seen in FIG. 6D, in the predicted images, nuclear size of the treated cells was determined to be smaller than the control cells.

Example 2: Assessing the Effect of a Microtubule Targeting Agent

The following example outlines experiments that were undertaken to determine the effect that a microtubule targeting agent, such as paclitaxel, has on cells and how these effects can be assessed using the various methods described herein.

Figure 7:
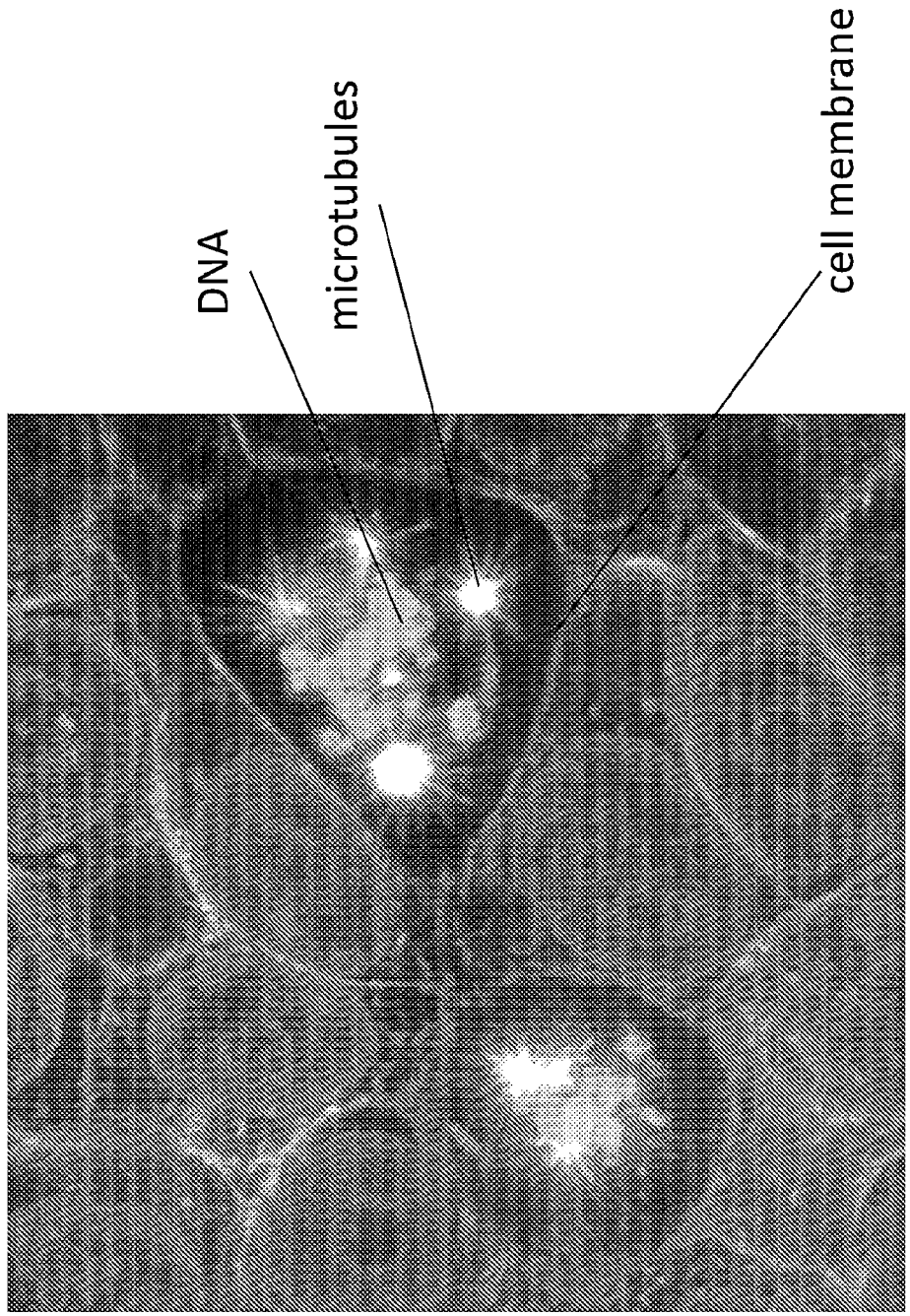
FIG. 7 shows single center plane showing the effect of paclitaxel on the target microtubules during mitosis. Microtubules, DNA, and Cell membrane are each labeled.

Paclitaxel increases microtubule bundle thickness and during cell division. The effect on hiPSC division causes arrest of cells in metaphase with some alteration in shape and position of the mitotic bipolar spindle. This can be observed with microtubule and DNA structures (see FIG. 7), where an increase in microtubule density can be observed.

The fluorescent signal from the hiPSC Cell Line ID: AICS-0061 c1.36 Histone H2B type 1-J mEGFP-tagged (DNA tag) was used to train and validate the label free prediction model.

Figures 8A, 8B, 8C, 8D, 8E, 8F:
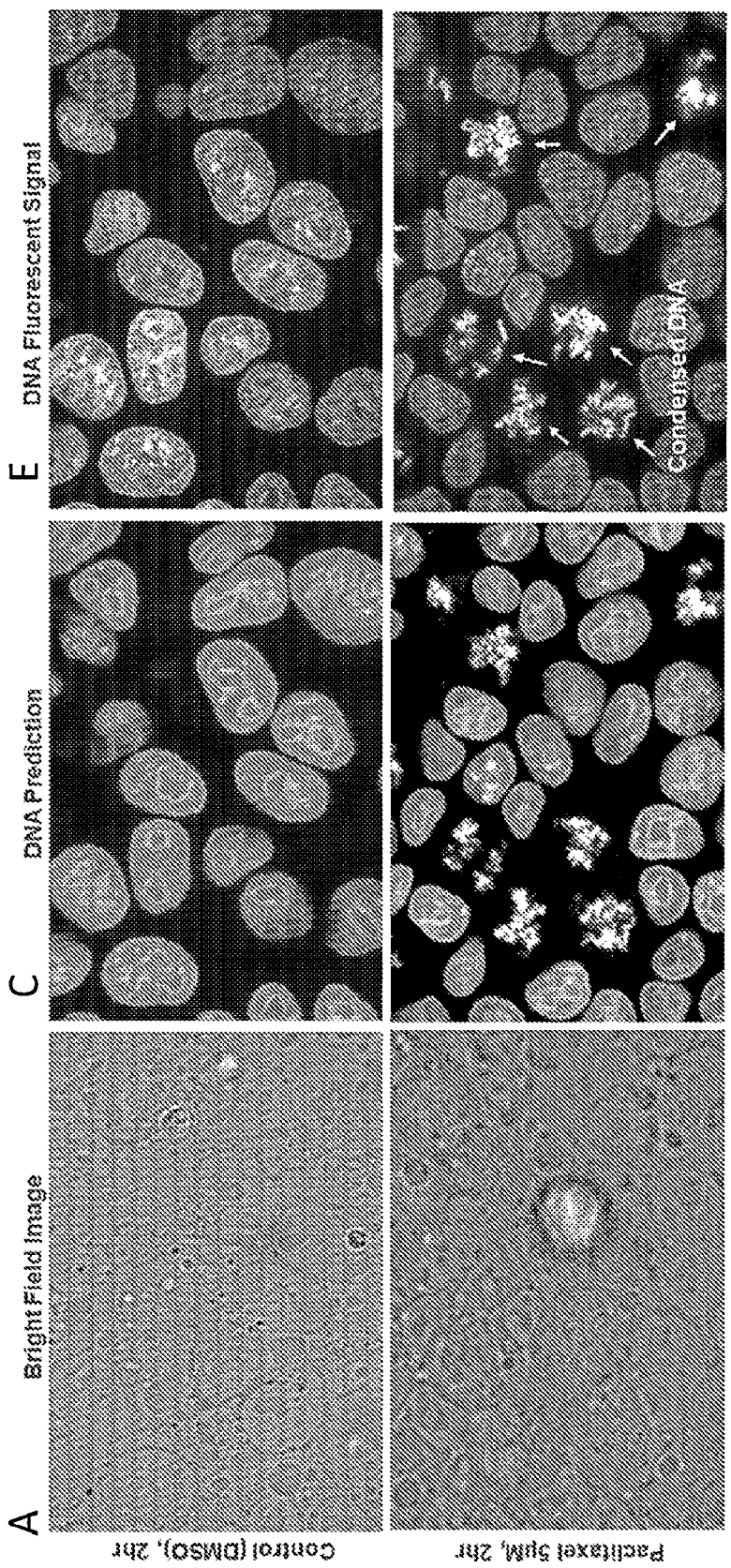
FIGS. 8A-8F show the assessment of the effect of paclitaxel on hiPSCs using the label-free methods described herein.

FIG. 8A shows a brightfield image of hiPSCs treated with DMSO after 2 hours (control). FIG. 8B shows a brightfield image of hiPSCs treated with 5 µM paclitaxel after 2 hours.

FIG. 8E shows a fluorescence image of the control cells, labeled with mEGFP, to label DNA. FIG. 8F shows a fluorescence image of the paclitaxel treated cells, also labeled with mEGFP, illustrating the increase in condensed DNA, as a result of the cells being arrested in metaphase.

FIGS. 8C and 8D show the predicted images, based on the label free prediction model, obtained by imaging the nucleus of the cells with brightfield microscopy, and predicting the location and amount of condensed DNA, based on the trained model. As seen in FIG. 8D, in the predicted images, the amount of condensed DNA in the treated cells was determined to be higher than the control cells.

Predicted imaging was also used with H2B (DNA) on Cell Line ID: AICS-0012 c1.105, Alpha tubulin mEGFP-tagged, to confirm the phenotype by two structures from the same cells.

Figures 9A, 9B, 9C, 9D, 9E, 9F:
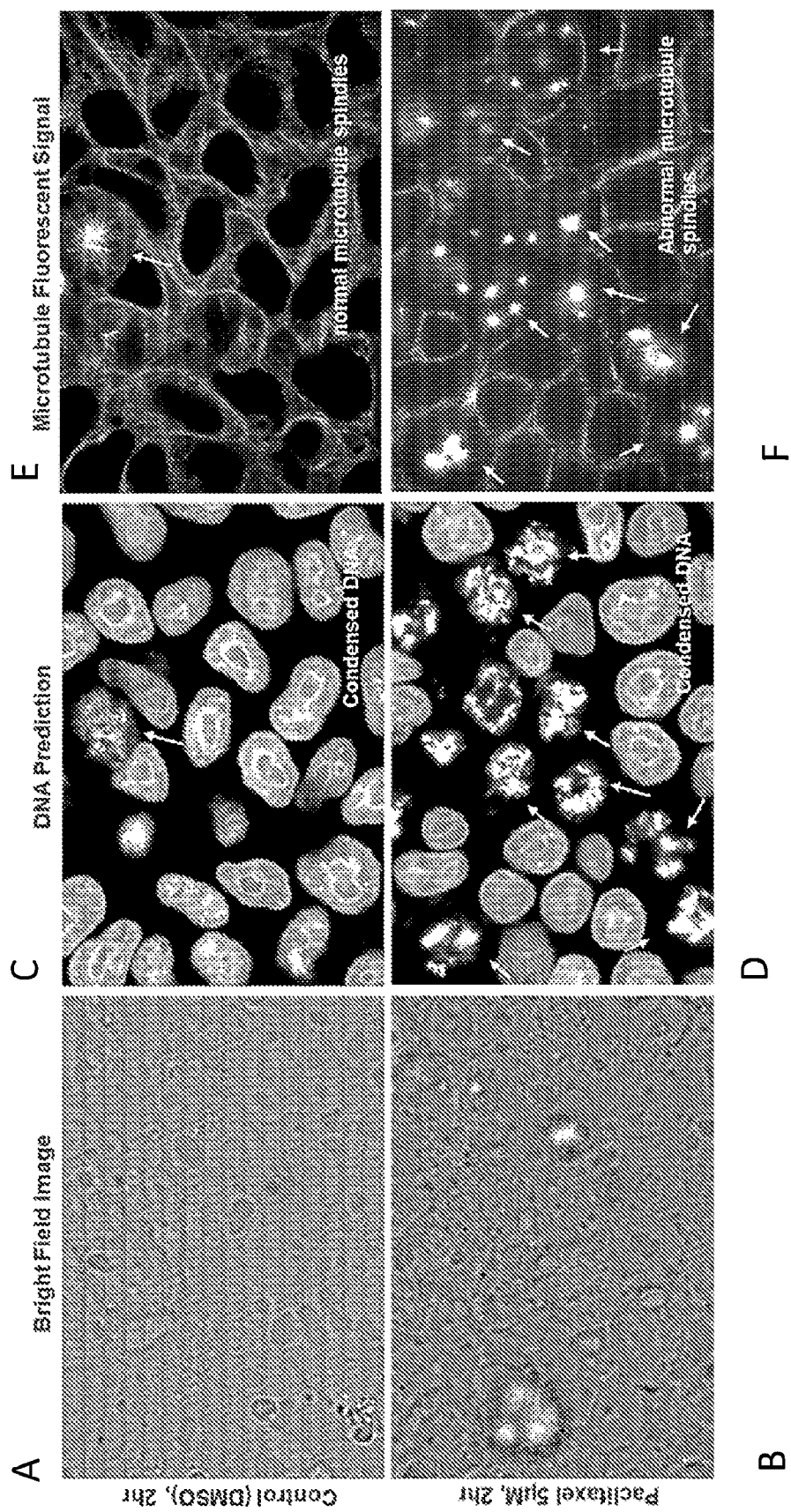
FIGS. 9A-9F show additional assessment of the effect of paclitaxel on hiPSCs using the label-free methods described herein.

FIG. 9A shows a brightfield image of hiPSCs treated with DMSO after 2 hours (control). FIG. 9B shows a brightfield image of hiPSCs treated with 5 µM paclitaxel after 2 hours.

FIG. 9E shows a fluorescence image of the control cells, Alpha tubulin mEGFP-tagged, to label microtubules. FIG. 9F shows a fluorescence image of the paclitaxel treated cells, also labeled with Alpha tubulin mEGFP-tagged, illustrating the increase in microtubule formation, as a result of the cells being arrested in metaphase.

FIGS. 9C and 9D show the predicted images, based on the label free prediction model, obtained by imaging the nucleus of the cells with brightfield microscopy, and predicting the location and amount of condensed DNA, based on the trained model. As seen in FIG. 9D, the amount of condensed DNA in the treated cells was determined to be higher than the control cells, in the predicted images, and also to correspond with increased microtubule formation in the fluorescently labeled images, in FIG. 9F.

Example 3: Comparison of Two Drug Classes Using Label Free Imaging

The following example demonstrates that the label free imaging techniques described herein can be utilized to compare two different drug classes.

The distinct increase in frequency of DNA condensation phenotype induced by Paclitaxel, and the distinct smaller nuclear volume phenotype induced by Rapamycin, can be predicted with the label free imaging and identified as distinct from other drug perturbations on the same or different cell types.

Figures 10A, 10B, 10C, 10D, 10E, 10F, 10G, 10H:
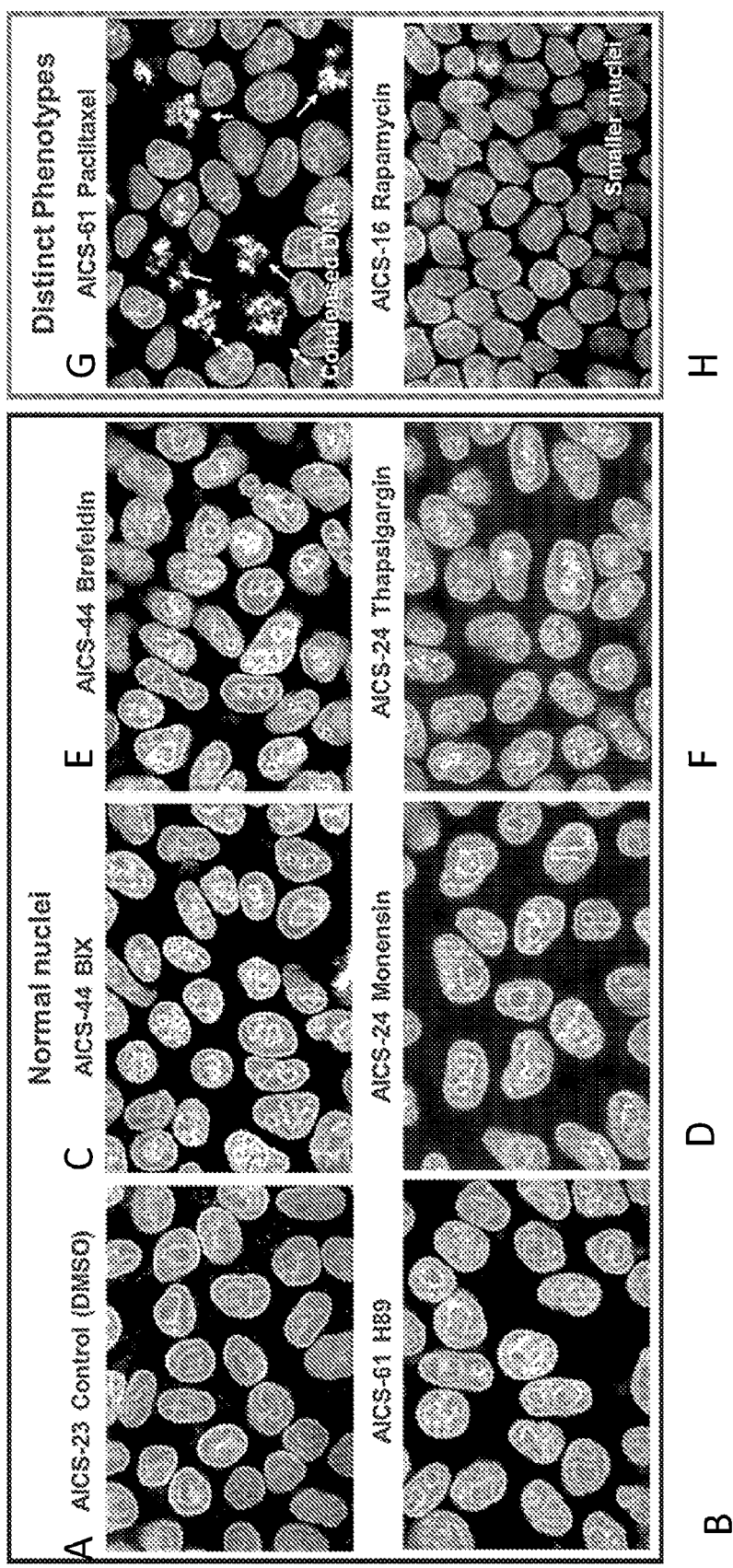
FIGS. 10A-10H show the label-free prediction and identification of Paclitaxel and Rapamycin distinct phenotypes regardless of the cell type.

FIGS. 10A-10H show the predicted, label free imaging effects of different drugs on different, differentiated, hiPSC cell lines. FIG. 10A, AICS-23 (tight junction)-control (DMSO); FIG. 10B, AICS-61 (Histone)-treated with H89, a protein kinase inhibitor with greatest effect on protein kinase A. FIG. 10C shows AICS-44 (Golgi), treated with BIX-01294, a diazepin-quinazolinamine derivative, which is a histone-lysine methyltransferase (HMTase) inhibitor that modulates the epigenetic status of chromatin. FIG. 10D shows AICS-24 (non-muscle Myosin) treated with Monensin, a polyether antibiotic isolated from *Streptomyces cinnamonensis*. FIG. 10E shows AICS-44 cells treated with Brefeldin, a lactone antiviral produced by the fungus *Penicillium brefeldianum*. Brefeldin inhibits protein transport from the endoplasmic reticulum to the golgi complex indirectly by preventing association of COP-I coat to the Golgi membrane. FIG. 10F shows AICS-16 (beta Actin) cells treated with Thapsigargin, a non-competitive inhibitor of the sarco/endoplasmic reticulum $Ca^{2+}$ ATPase. Each of these compounds in FIGS. 10B-10F acts on distinct cellular mechanisms and structures, and in all cases, no predicted effect on DNA, nuclear size, or microtubule formation, is shown in the predicted images.

In contrast, in the AICS-61 cells treated with paclitaxel, FIG. 10G shows the predicted, label free imaging effect of condensed DNA (condensed microtubules) a unique phenotype of the microtubule targeting agent, paclitaxel. In FIG. 10H, in the AICS-16 cells, the effect of rapamycin, which reduces DNA volume and thus nuclear size, is clearly seen in the unique, predicted label-free image.

The distinct DNA perturbation signatures of Rapamycin (smaller nuclear volume and higher nuclear density) and Paclitaxel (increase in frequency of DNA condensation frequency, larger nuclear volume and higher nuclear density) can be identified based on simple population statistics following DNA segmentation, feature extraction, feature-based identification of DNA condensation and feature-based metrics extracted from label free prediction of DNA from 3D brightfield images, as described herein. These signatures were distinct from those of other drug perturbations such as BIX, Brefeldin, H89, and Monensin. The identification of these perturbation signatures were performed in the following EGFP-tagged cell lines; AICS-23 (tight junction), AICS-44 (Golgi), AICS-61 (Histone), AICS-24 (non-muscle Myosin) and AICS-16 (beta Actin) without additional introduction of DNA signals.

Figure 11A:
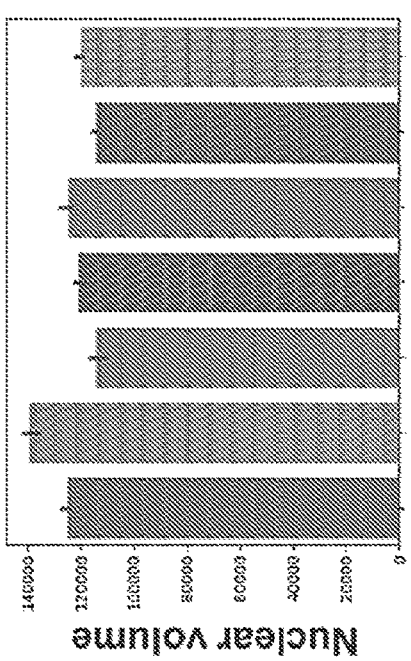
FIG. 11A-11C show the drug perturbation signature using label free prediction, as described herein.
Figure 11B:
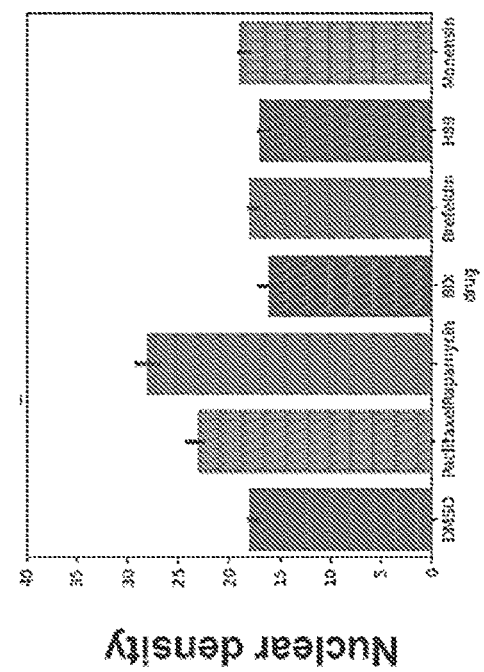
Figure 11C:
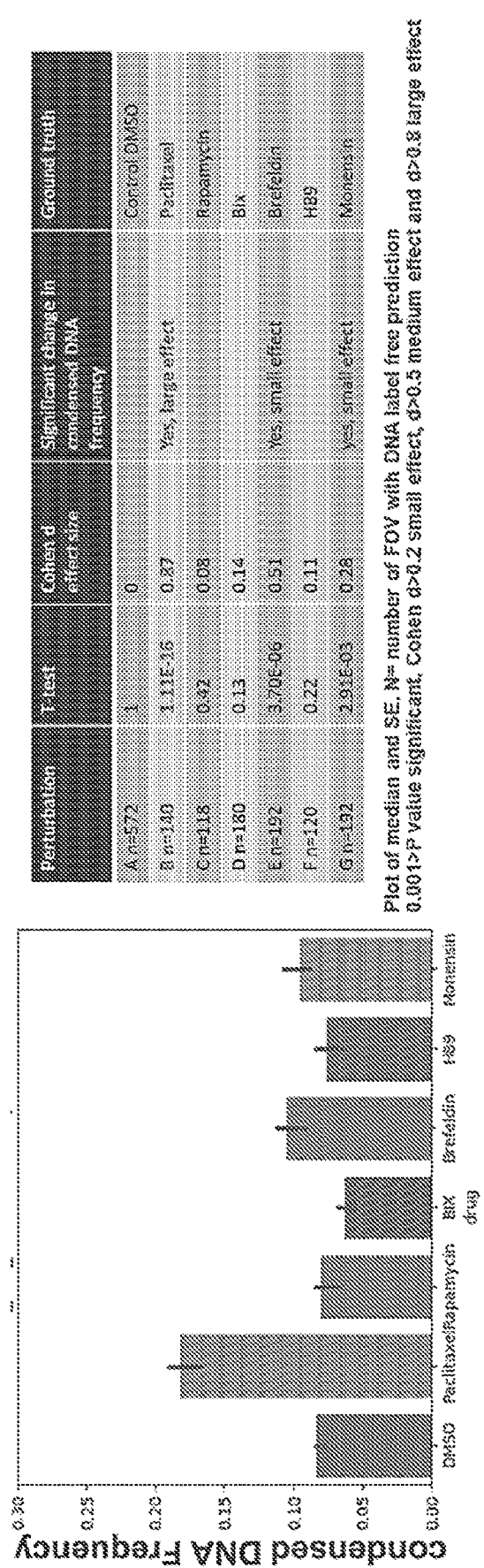

As shown in FIG. 11A-11C, rapamycin signature in the predicted images is evident as a smaller nuclear volume and higher nuclear density. Paclitaxel in the predicted images demonstrated increased condensed DNA Frequency, resulting in a larger nuclear volume and a higher nuclear density.

Additional Discussion of Various Embodiments

Embodiment 1 is a method for assessing an effect of a compound on a cell, the method comprising: obtaining a 3D microscopy image that is a transmitted light image of one or more structures of the cell that has been treated with the compound, wherein no fluorescence labeling is included in the 3D microscopy image; generating, with a neural network, a predicted 3D fluorescence image that includes predicted fluorescence labeling of the one or more structures of the cell; identifying the effect of the compound on the cell based on the predicted 3D fluorescence image; and assessing the effect of the compound against a comparison set of one or more known effects for the cell.

Embodiment 2 includes the method Embodiment 1, wherein the one or more structures include at least one of a cell membrane, a plasma membrane, a nucleus, a nuclear fragment, a mitochondrion, a microtubule, an endoplasmic reticulum, a vacuole, an endosome, an autophagosome, a Golgi Apparatus, a membrane protein, a plasma membrane bleb, or a lysosome.

Embodiment 3 includes the method of any of Embodiments 1-2, wherein the effect of the compound is one or more of a change in average or median cell size, a change in cell viability, a change in nuclear size, a change in cell confluency, a change in cell count, a change in cell morphology, a change in cell cycle phase, a change in microtubule structure, a change in cell growth rate, a change in cell integrity, a change in membrane integrity, a change in organelle integrity, a change in mitochondrial activation level, a change in differentiation state, or a change in quantity of transgenic protein produced.

Embodiment 4 includes the method of any of Embodiments 1-3, wherein the cell is a mammalian cell.

Embodiment 5 includes the method of Embodiment 4, wherein the mammalian cell is a cancer cell, a Chimeric Antigen Receptor (CAR) T-cell, a Chinese Hamster Ovary (CHO) cell, a Human Embryonic Kidney (HEK) cell, an HeLa cell, a Jurkat T-cell, or a stem cell.

Embodiment 6 includes the method of any of Embodiments 1-5, wherein the compound is a biologic.

Embodiment 7 includes the method of any of Embodiments 1-5, wherein the compound is a small molecule.

Embodiment 8 includes the method of any of Embodiments 1-7, wherein the compound is an anticancer compound, an antiviral compound, a compound to treat a neurological disease, a compound to treat a blood disease, a compound to treat a muscular disease, a compound to treat a bone disease.

Embodiment 9 includes the method of Embodiment 8, wherein the anticancer compound is a microtubule inhibitor, an alkylating agent, an antimetabolite, an mTOR inhibitor or a topoisomerase I or II inhibitor.

Embodiment 10 includes the method of Embodiment 9, wherein the anticancer compound is a taxane or rapamycin.

Embodiment 11 includes the method of any of Embodiments 1-10, wherein the assessing the effect against the comparison set provides a classification of the compound and/or an activity determination of the compound.

Embodiment 12 is a method for assessing a classification of a compound and/or an activity determination of a compound, the method comprising: obtaining a 3D microscopy image that is a transmitted light image of one or more structures of a cell that has been treated with the compound, wherein no fluorescence labeling is included in the 3D microscopy image; generating, with a neural network, a predicted 3D fluorescence image that includes predicted fluorescence labeling of the one or more structures of the cell; identifying the effect of the compound on the cell based on the predicted 3D fluorescence image; and assessing the effect against a comparison set of one or more known compounds for the cell.

Embodiment 13 includes the method of Embodiment 12, wherein the one or more structures include at least one of a cell membrane, a plasma membrane, a nucleus, a nuclear fragment, a mitochondrion, a microtubule, an endoplasmic reticulum, a vacuole, an endosome, an autophagosome, a Golgi Apparatus, a membrane protein, a plasma membrane bleb, or a lysosome.

Embodiment 14 includes the method of any of Embodiments 12-13, wherein the effect of the compound is one or more of a change in average or median cell size, a change in cell viability, a change in cell confluency, a change in nuclear size, a change in cell count, a change in cell morphology, a change in cell cycle phase, a change in cell growth rate, a change in cell integrity, a change in microtubule structure, a change in membrane integrity, a change in organelle integrity, a change in mitochondrial activation level, a change in differentiation state, or a change in quantity of transgenic protein produced.

Embodiment 15 includes the method of any of Embodiments 12-14, wherein the cell is a mammalian cell.

Embodiment 16 includes the method of Embodiment 15, wherein the mammalian cell is a cancer cell, a Chimeric Antigen Receptor (CAR) T-cell, a Chinese Hamster Ovary (CHO) cell, a Human Embryonic Kidney (HEK) cell, an HeLa cell, a Jurkat T-cell, or a stem cell.

Embodiment 17 includes the method of any of Embodiments 12-16, wherein the compound is a biologic.

Embodiment 18 includes the method of any of Embodiments 12-16, wherein the compound is a small molecule.

Embodiment 19 includes the method of any of Embodiments 12-18, wherein the compound is an anticancer compound, an antiviral compound, a compound to treat a neurological disease, a compound to treat a blood disease, a compound to treat a muscular disease, a compound to treat a bone disease.

Embodiment 20 includes the method of Embodiment 19, wherein the anticancer compound is a microtubule inhibitor, an alkylating agent, an antimetabolite, an mTOR inhibitor, or a topoisomerase I or II inhibitor.

Embodiment 12 includes the method of Embodiment 19, wherein the anticancer compound is a taxane or rapamycin.

It is to be understood that while certain embodiments have been illustrated and described herein, the claims are not to be limited to the specific forms or arrangement of parts described and shown. In the specification, there have been disclosed illustrative embodiments and, although specific terms are employed, they are used in a generic and descriptive sense only and not for purposes of limitation. Modifications and variations of the embodiments are possible in light of the above teachings. It is therefore to be understood that the embodiments may be practiced otherwise than as specifically described.

While various embodiments have been described above, it should be understood that they have been presented only as illustrations and examples of the present technology, and not by way of limitation. It will be apparent to persons skilled in the relevant art that various changes in form and detail can be made therein without departing from the spirit and scope of the present technology. Thus, the breadth and scope of the present technology should not be limited by any of the above-described embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

The invention claimed is:

1. A method for assessing an effect of a compound on a cell, the method comprising:
   a. obtaining a 3D microscopy image that is a transmitted light image of one or more structures of the cell that has been treated with the compound, wherein no fluorescence labeling is included in the 3D microscopy image;
   b. generating, with a neural network, a predicted 3D fluorescence image that includes predicted fluorescence labeling of the one or more structures of the cell;
   c. identifying the effect of the compound on the cell based on the predicted 3D fluorescence image; and
   d. assessing the effect of the compound against a comparison set of one or more known effects for the cell, wherein the compound is an anticancer compound, an antiviral compound, a compound to treat a neurological disease, a compound to treat a blood disease, a compound to treat a muscular disease, or a compound to treat a bone disease.

2. The method of claim 1, wherein the one or more structures include at least one of a cell membrane, a plasma membrane, a nucleus, a nuclear fragment, a mitochondrion, a microtubule, an endoplasmic reticulum, a vacuole, an endosome, an autophagosome, a Golgi Apparatus, a membrane protein, a plasma membrane bleb, or a lysosome.

3. The method of claim 1, wherein the effect of the compound is one or more of a change in average or median cell size, a change in cell viability, a change in nuclear size, a change in cell confluency, a change in cell count, a change in cell morphology, a change in cell cycle phase, a change in microtubule structure, a change in cell growth rate, a change in cell integrity, a change in membrane integrity, a change in organelle integrity, a change in mitochondrial activation level, a change in differentiation state, or a change in quantity of transgenic protein produced.

4. The method of claim 1, wherein the cell is a mammalian cell.

5. The method of claim 4, wherein the mammalian cell is a cancer cell, a Chimeric Antigen Receptor (CAR) T-cell, a Chinese Hamster Ovary (CHO) cell, a Human Embryonic Kidney (HEK) cell, an HeLa cell, a Jurkat T-cell, or a stem cell.

6. The method of claim 1, wherein the compound is a biologic.

7. The method of claim 1, wherein the compound is a small molecule.

8. The method of claim 1, wherein the anticancer compound is a microtubule inhibitor, an alkylating agent, an antimetabolite, an mTOR inhibitor or a topoisomerase I or II inhibitor.

9. The method of claim 8, wherein the anticancer compound is a taxane or rapamycin.

10. The method of claim 1, wherein the assessing the effect against the comparison set provides a classification of the compound and/or an activity determination of the compound.

11. A method for assessing a classification of a compound or an activity determination of a compound, the method comprising:
   a. obtaining a 3D microscopy image that is a transmitted light image of one or more structures of a cell that has been treated with the compound, wherein no fluorescence labeling is included in the 3D microscopy image;
   b. generating, with a neural network, a predicted 3D fluorescence image that includes predicted fluorescence labeling of the one or more structures of the cell;
   c. identifying the effect of the compound on the cell based on the predicted 3D fluorescence image; and
   d. assessing the effect against a comparison set of one or more known compounds for the cell, wherein the compound is an anticancer compound, an antiviral compound, a compound to treat a neurological disease, a compound to treat a blood disease, a compound to treat a muscular disease, or a compound to treat a bone disease.

12. The method of claim 11, wherein the one or more structures include at least one of a cell membrane, a plasma membrane, a nucleus, a nuclear fragment, a mitochondrion, a microtubule, an endoplasmic reticulum, a vacuole, an endosome, an autophagosome, a Golgi Apparatus, a membrane protein, a plasma membrane bleb, or a lysosome.

13. The method of claim 11, wherein the effect of the compound is one or more of a change in average or median cell size, a change in cell viability, a change in cell confluency, a change in nuclear size, a change in cell count, a change in cell morphology, a change in cell cycle phase, a change in cell growth rate, a change in cell integrity, a change in microtubule structure, a change in membrane integrity, a change in organelle integrity, a change in mitochondrial activation level, a change in differentiation state, or a change in quantity of transgenic protein produced.

14. The method of claim 11, wherein the cell is a mammalian cell.

15. The method of claim 14, wherein the mammalian cell is a cancer cell, a Chimeric Antigen Receptor (CAR) T-cell, a Chinese Hamster Ovary (CHO) cell, a Human Embryonic Kidney (HEK) cell, an HeLa cell, a Jurkat T-cell, or a stem cell.

16. The method of claim 11, wherein the compound is a biologic or is a small molecule.

17. The method of claim 11, wherein the anticancer compound is a microtubule inhibitor, an alkylating agent, an antimetabolite, an mTOR inhibitor, or a topoisomerase I or II inhibitor.

18. The method of claim 11, wherein the anticancer compound is a taxane or rapamycin.

* * * * *